United States Patent
Kumar et al.

(10) Patent No.: US 10,892,983 B2
(45) Date of Patent: Jan. 12, 2021

(54) SHARED RISK LINK GROUP ROBUSTNESS WITHIN AND ACROSS MULTI-LAYER CONTROL PLANES

(71) Applicant: Cisco Technology, Inc., San Jose, CA (US)

(72) Inventors: Praveen Kumar, Karnataka (IN); Navdeep Sood, Karnataka (IN); Ankur Govil, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 16/047,855

(22) Filed: Jul. 27, 2018

(65) Prior Publication Data
US 2020/0036623 A1 Jan. 30, 2020

(51) Int. Cl.
| | |
|---|---|
| H04L 12/707 | (2013.01) |
| H04L 12/703 | (2013.01) |
| H04J 3/16 | (2006.01) |
| H04L 12/723 | (2013.01) |
| H04L 12/24 | (2006.01) |

(52) U.S. Cl.
CPC ............ H04L 45/22 (2013.01); H04J 3/1652 (2013.01); H04L 45/24 (2013.01); H04L 45/28 (2013.01); H04L 45/50 (2013.01); *H04L 41/12* (2013.01)

(58) Field of Classification Search
None
See application file for complete search history.

(56) References Cited

U.S. PATENT DOCUMENTS

| | | | |
|---|---|---|---|
| 2002/0030864 A1* | 3/2002 | Chaudhuri | H04J 14/0227 398/5 |
| 2002/0112072 A1* | 8/2002 | Jain | H04L 45/00 709/239 |

(Continued)

OTHER PUBLICATIONS

Lu Shen, et al., "Shared Rish Link Group (SRLG)—Diverse Path Provisioning Under Hybrid Service Level Agreements in Wavelength-Routed Optical Mesh", CSE Journal Articles, University of Nebraska—Lincoln, Department of Computer Science and Engineering, http://digitalcommons.unl.edu/csearticles/78, IEEE/ACM Transactions on Networking, vol. 13, No. 4, Aug. 2005, 15 pages.

(Continued)

*Primary Examiner* — Ayaz R Sheikh
*Assistant Examiner* — Tarell A Hampton
(74) *Attorney, Agent, or Firm* — Edell, Shapiro & Finnan, LLC

(57) ABSTRACT

An indication of a combination of a Shared Risk Link Group identifier and a node identifier for each of a plurality of links through at least one network and between a source network device and a destination network device is received at a network device. A primary path through the at least one network between the source network device and the destination network device is determined at the network device. The primary path comprises a first subset of the plurality of links through the at least one network. A back-up path through the at least one network between the source network device and the destination network device is determined at the network device. The back-up path comprises a second subset of the plurality of links through the at least one network.

20 Claims, 8 Drawing Sheets

(56) References Cited

U.S. PATENT DOCUMENTS

| | | | | |
|---|---|---|---|---|
| 2002/0131424 | A1* | 9/2002 | Suemura | H04L 41/12 370/400 |
| 2003/0174644 | A1* | 9/2003 | Yagyu | H04L 41/0663 370/228 |
| 2004/0205239 | A1* | 10/2004 | Doshi | H04J 14/0227 709/241 |
| 2004/0218612 | A1* | 11/2004 | Zetterlund | H04L 29/06 370/401 |
| 2006/0114818 | A1* | 6/2006 | Canali | H04L 43/0811 370/216 |
| 2006/0133265 | A1* | 6/2006 | Lee | H04L 12/4641 370/228 |
| 2006/0140190 | A1* | 6/2006 | Lee | H04L 45/04 370/395.3 |
| 2007/0011284 | A1* | 1/2007 | Le Roux | H04L 45/28 709/223 |
| 2007/0211732 | A1* | 9/2007 | Suemura | H04L 45/00 370/400 |
| 2008/0205271 | A1* | 8/2008 | Aissaoui | H04L 12/66 370/235 |
| 2010/0008222 | A1* | 1/2010 | Le Roux | H04L 45/02 370/228 |
| 2013/0232259 | A1* | 9/2013 | Csaszar | H04L 43/0817 709/224 |
| 2015/0172171 | A1* | 6/2015 | Beller | H04L 45/128 398/45 |

OTHER PUBLICATIONS

János Tapolcai, "Shared Risk Link Group Failure Restoration with In-Band Approximate Failure Localization", Dept. of Telecommunications and Media Informatics, Budapest University of Technology and Economics, Mar. 27, 2012, 9 pages.

K. Shiomoto, et al., "Requirements for GMPLS-Based multi-Region and Multi-Layer Networks (MRN/MLN)", Network Working Group, RFC 5212, Jul. 2008, 28 pages.

Hong Yan, et al., "Tesseract: A 4D Network Control Plane", 4th USENIX Symposium on Networked Systems Design & Implementation, NSDI, vol. 7, Apr. 2007, 14 pages.

K. Kompella, Ed., et al., "Routing Extensions in Support of Generalized Multi-Protocol Label Switching (GMPLS)", Network Working Group, RFC 4202, Oct. 2005, 27 pages.

"Architecture of optical transport networks", Series G: Transmission Systems and Media, Digital Systems and Networks—Digital networks—Optical transport networks, G.872, ITU-T Telecommunication Standardization Sector of ITU, Recommendation ITU-T G.872, Jan. 2017, 70 pages.

L. Berger, Editor, Movaz Networks, Jan. 2003, "Gereralized Multi-Protocol Label Switching (GMPLS) Signaling Resource ReserVation Protocol-Traffic Engineering (RSVP-TE) Extensions", Network Working Group, RFC 3473, 42 pages.

D. Awduche, et al., "RSVP-TE: Extensions to RSVP for LSP Tunnels", Network Working Group, Dec. 2001, RFC 3209, 61 pages.

F. Zhang, Ed., et al., "RSVP-TE Extensions for Collecting Shared Risk Link Group (SRLG) Information", Internet Engineering Task Force (IETF), ISSN: 2070-1721, Jan. 2017, RFC 8001, 16 pages.

L. Berger, Editor, Movaz Networks, Jan. 2003, "Generalized Multi-Protocol Label Switching (GMPLS) Signaling Functional Description", Network Working Group, RFC 3471, 34 pages.

"Interfaces for the optical transport network", Serise G: Transmission Systems and Media, Digital Systems and Networks, Digital terminal equipments—General, Series Y: Golbal Information Infrastructure, Internet Protocol Aspects and Next-Generation Networks, Internet of Things and Smart Cites, G.709/Y.1331, Recommendation ITU-T G.709/Y.1331, pp. 1-122.

"Interfaces for the optical transport network", Serise G: Transmission Systems and Media, Digital Systems and Networks, Digital terminal equipments—General, Series Y: Golbal Information Infrastructure, Internet Protocol Aspects and Next-Generation Networks, Internet of Things and Smart Cites, G.709/Y.1331, Recommendation ITU-T G.709/Y.1331, pp. 123-244.

* cited by examiner

SHARED RISK LINK GROUP ROBUSTNESS WITHIN AND ACROSS MULTI-LAYER CONTROL PLANES

TECHNICAL FIELD

The present disclosure relates to network routing, and in particular, network implementations that utilize Shared Risk Link Groups.

BACKGROUND

The Generalized Multiprotocol Label Switching protocol reuses and enhances Multiprotocol Label Switching signaling and Internet routing protocol capabilities to provide a generic efficient scalable and standardized distributed control plane architecture. Generalized Multiprotocol Label Switching concepts are applicable to multiple network technologies, including Time Division Multiplexing and packet switch capable routers, as well as Lambda switch capable and fiber switch capable interfaces.

In Multiprotocol Label Switching traffic engineering, a Shared Risk Link Group is a set of links sharing a common resource, which affects all links in the set if the common resource fails. These links share the same risk of failure and are therefore considered to belong to the same Shared Risk Link Group. For example, links sharing a common fiber are said to be in the same Shared Risk Link Group because a fault with the fiber might cause all links in the group to fail.

DESCRIPTION OF EXAMPLE EMBODIMENTS

Overview

Figure 1:
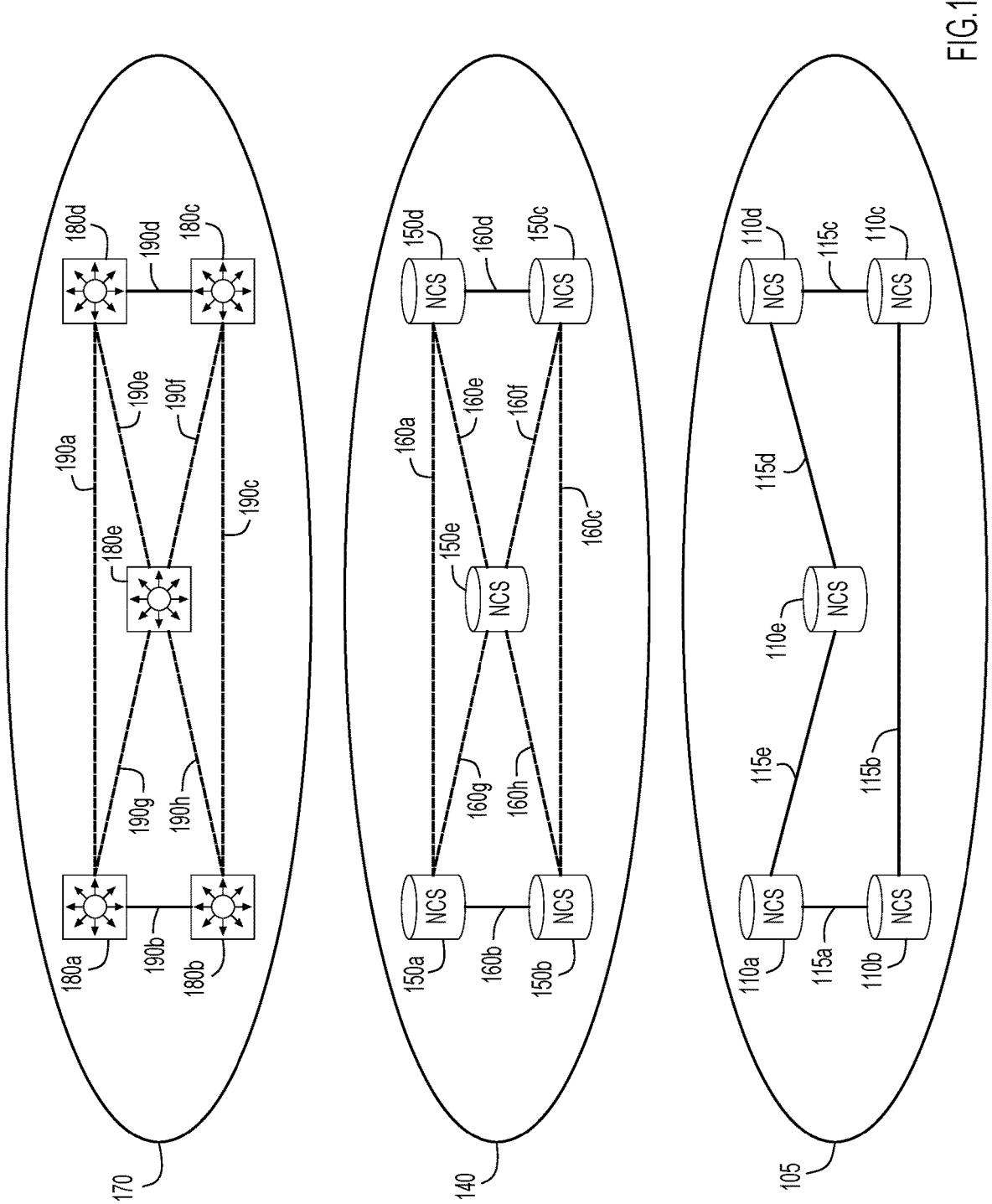
FIG. 1 illustrates a multilayer control plane implementing Shared Risk Link Group robustness, according to an example embodiment.

Briefly, mechanisms and network implementations are presented herein that utilize Shared Risk Link Groups. In one embodiment, an indication of a combination of a Shared Risk Link Group identifier and a node identifier for each of a plurality of links through at least one network, and between a source network device and a destination network device, is received at a network device. A primary path through the at least one network between the source network device and the destination network device is determined at the network device. The primary path comprises a first subset of the plurality of links through the at least one network. A back-up path through the at least one network between the source network device and the destination network device is determined at the network device. The back-up path comprises a second subset of the plurality of links through the at least one network. The primary path and the back-up path are determined by selecting the first subset and the second subset such that each link in the first subset is associated with a combination of a Shared Risk Link Group identifier and a node identifier that is not associated with any link in the second subset.

Example Embodiments

Generalized Multiprotocol Label Switching (GMPLS), also known as Multiprotocol Lambda Switching, is a technology that provides enhancements to Multiprotocol Label Switching (MPLS) to support network switching for time, wavelength, and space switching as well as for packet switching. MPLS involves setting up a specific path for a given sequence of packets by labeling every packet so that a routing table does not have to be referred in order to figure out which outward path a packet should be switched to toward its destination. MPLS is called "multiprotocol" because it works with the Internet Protocol (IP), Asynchronous Transport Mode (ATM), and frame relay network protocols. In addition to moving traffic faster, MPLS makes it easier to manage a network for quality of service (QoS). The use of MPLS has become widespread as networks carry increasing volumes and varieties of traffic such as Voice over IP (VoIP). GMPLS extends MPLS to manage further classes of interfaces and switching technologies other than packet interfaces and switching, such as time division multiplexing, Open Systems Interconnection (OSI) Model Layer-2 switching, wavelength switching and fiber-switching.

GMPLS is also configured to provide: dynamic neighbor and topology discovery across multi-vendor GMPLS aware transport networks; automatic Label-Switched Path (LSP) provisioning; and capability to dynamically provision, protect, and restore end-to-end LSPs across all above types of transport equipment, within and across multiple layers, eliminating or reducing the need for separate network control planes.

As part of the dynamic provisioning, protecting and restoring end-to-end LSPs, GMPLS utilizes a concept known as Shared Risk Link Groups (SRLG). A set of links may constitute an SRLG if the links share a resource whose failure may affect all links in the set. For example, two fibers in the same conduit may be in the same SRLG. When generating paths for network traffic, including GMPLS paths, a primary and back-up path are often defined for the traffic. To lessen the probability that the primary and back-up path will fail at the same time, the primary and back-up paths may be selected with SRLG diversity, meaning no link in the primary path will be in the same SRLG as any link the back-up path.

Reference is made to FIG. 1. Control planes may be present across several layers of a network implementation 100, such as the layers 105, 140 and 170 of FIG. 1, in order to implement GMPLS provisioning. Layer 105 represents the OSI layer 0, the cabling or infrastructure layer. In the network embodiment of FIG. 1, the control plane of layer 105 controls the Dense Wavelength Division Multiplexing (DWDM) nodes 110*a-e* and fiber links 115*a-e*. Layer 140 represents the OSI Layer 1, the physical layer, control plane that includes the Optical Transport Network (OTN) GMPLS control plane. Layer 140 includes OTN nodes 150*a-e* and OTN links 160*a-h*. Layer 170 resides at OSI model layer 2 or 3 and includes MPLE-Traffic Engineering (MPLS-TE) routers 180*a-e* and logical TE links 190*a-h*. As illustrated in FIG. 1, the links 160*a-h* at layer 140 and the links 190*a-h* at layer 170 may not correspond exactly with links 115*a-e* of layer 105. For example, in layer 140, it may appear that a path between nodes 150*a* and 150*d* that traverses link 160*a* is completely diverse from a path that traverses links 160*g* and 160*e*. Similarly, it may appear that a path between nodes 180*a* and 180*d* via link 190*a* in layer 170 is completely diverse from a path that utilizes links 190*g* and 190*e*. Yet, as illustrated in layer 105, these paths, which appear diverse in layers 140 and 170 may not be diverse in layer 105. Specifically, both paths in layers 140 and 170 may utilize links 115*e* and 115*d* in layer 105.

Accordingly, diversity is ensured at each layer of the network implementation 100 by sharing or publishing the SRLGs between the different control plane layers 105, 140 and 170. Nevertheless, even with the publication of the SRLGs between the different control plane layers 105, 140 and 170, errors may still be introduced that may result in less than optimal primary and back-up paths being selected. Such errors may be introduced through user error, or configuration errors within the control plane functionality, as will be discussed in detail with reference to FIG. 2 below.

Figure 2:
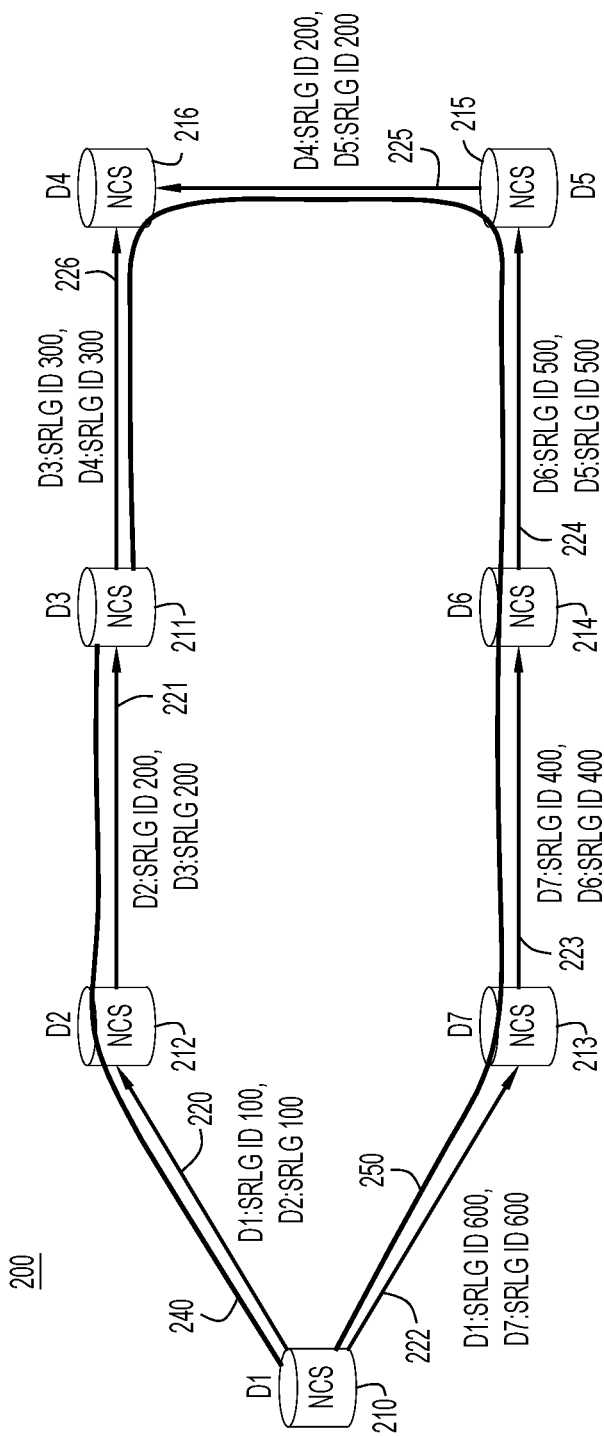
FIG. 2 illustrates a first network environment implementing Shared Risk Link Group robustness, according to an example embodiment.

With reference made to FIG. 2, depicted therein is a network environment 200 in which a configuration error introduced by a user or introduced via a control plane within the network environment 200 results in a determination that two network paths are not diverse, when in fact, the paths actually are diverse. As illustrated in FIG. 2, first path 240 connects traffic between source node 210 and destination node 211 via network link 220, network node 212 and network link 221. A second path 250 also connects source node 210 to destination node 221, but does so via network link 222, network node 213, network link 223 network node 214, network link 224, network node 215, network link 225, network node 216 and network link 226. As illustrated, first path 240 and second path 250 are diverse, there are no shared links between the two paths. Yet, as illustrated, network link 225 is assigned an SRLG identifier of "200," as is network link 221. Absent the techniques described herein, first path 240 and second path 250 would not be selected as primary and back-up paths, respectively, for traffic sent between network node 210 and network node 211 even though the paths are diverse. An error has been introduced that results in a common SRLG identifier (i.e., SRLG identifier "200") being present in both of first path 240 and second path 250. Due to this error, first path 240 and second path 250 do not appear to be diverse to the control plane provisioning the primary and back-up paths through network 200, and therefore, paths 240 and 250 will not be selected as a primary and back-up path combination.

The techniques of the present disclosure resolve this issue by associating each SRLG identifier with a node identifier. Accordingly, for link 221, the SRLG identifier of "200" is associated with the node identifier "D2" of network node 212 in the direction of first path 240 (and also associated with the node identifier "D3" associated with network node 211 in the opposite path direction). The SRLG identifier for link 225 is associated with the node identifier "D5" in the direction of second path 250 (and also associated with the node identifier "D4" for network node 216 in the opposite path direction). Similarly, SRLGs associated with each of the other network links 220-226 are associated with node identifiers for the networks nodes 210-216 from which the links originate. By associating an SRLG identifier with a node identifier, the situation described above in which two diverse paths are erroneously configured with the same SRLG identifier may be remedied.

For example, when determining whether or not first path 240 and second path 250 are diverse, the determination will not look at just the SRLG identifiers. Instead, the determination will consider SRLG identifier/node identifier pairs in determining whether or not two paths are diverse. In the example illustrated in FIG. 2, first path 240 and second path 250 would be determined to be diverse as there are no SRLG identifier/node identifier pairs common to both paths. Specifically, when the SRLG identifier/node identifier pairs for links 221 and 225 are considered, it is determined that the links are diverse. Links 221 and 225 may share a common SRLG identifier of "200," but their node identifiers are different, "D2" and "D5," respectively. Therefore, first path 240 may be determined to be the primary path for traffic between network node 210 and network node 211, and second path 250 may be determined to be the back-up path for the traffic.

If the network environment 200 of FIG. 2 is embodied within a single network environment, there are a number of options for the network node identifier that may be associated with an SRLG identifier to form an SRLG identifier/ node identifier pair. For example, an Internet Protocol (IP) address, a Media Access Control (MAC) address, a Simple Network Management Protocol (SNMP) identifier, and other known node and router identifiers may be used as the node identifier as these values may be unique within a single network environment or within an environment with a single control plane from a single vendor and equipment from that single vendor (i.e., a homogenous control plane).

Figure 3:
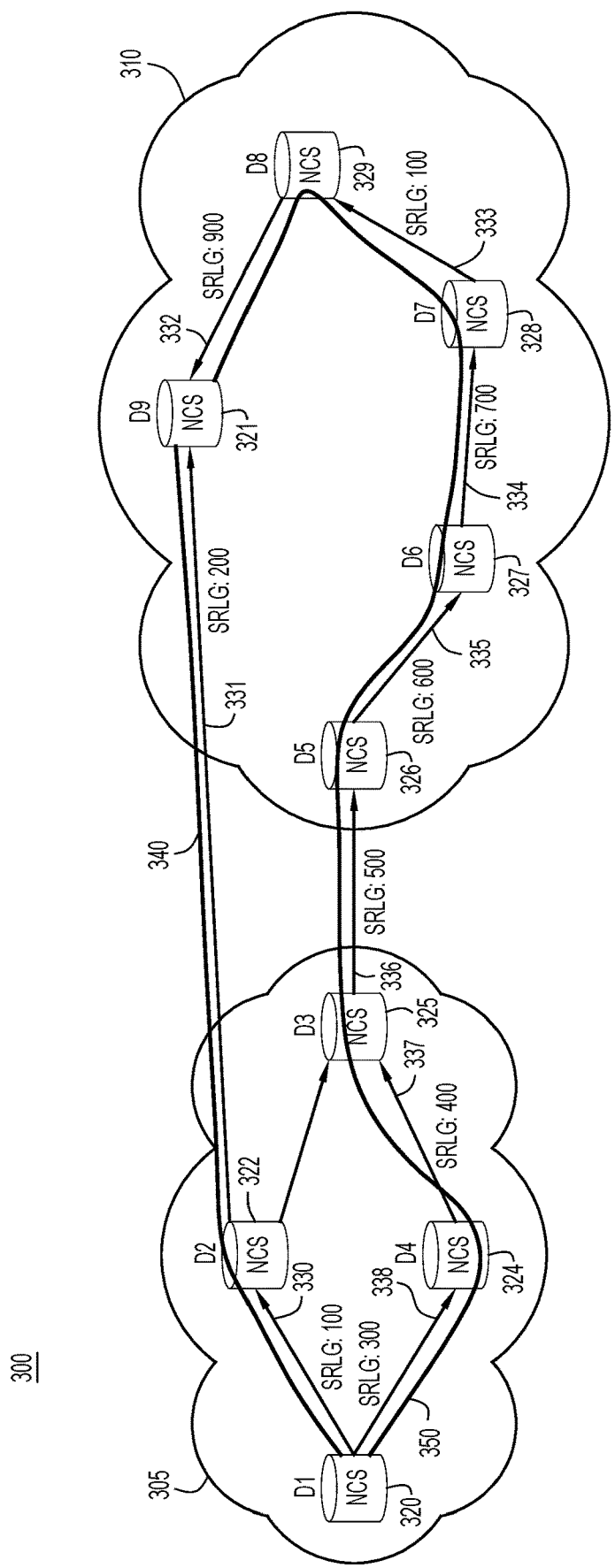
FIG. 3 illustrates a second network environment spanning two network implementations and implementing Shared Risk Link Group robustness, according to an example embodiment.

With reference now made to FIG. 3, illustrated therein is a network environment 300 in which the techniques of the present disclosure are applied within a multivendor control plane. Specifically, network environment 300 includes a first vendor network 305 and a second vendor network 310. These networks 305 and 310 may be configured independently from each other, and this independent configuration may result in links within the two networks being assigned the same SRLG identifier. Such an assignment is not the result of an error the way it was in network environment 200 of FIG. 2. Instead, because network 305 and network 310 are independently configured, this overlap of SRLG identifiers may be the result of chance/happenstance. This is the situation illustrated for network links 330 and 333. Both of these links have been configured with an SRLG identifier of "100." Absent the techniques of the present disclosure, first path 340 and second path 350 would not be selected as the primary and back-up paths for traffic sent from network node 320 to network node 321. When determining the primary and back-up paths, it would be determined that first path 340 and second path 350 are not diverse due to the inclusion of the SRLG identifier of "100" in both of the paths.

Through the application of the techniques of the present disclosure, it may be determined that network links 330 and 333 are diverse, permitting first path 340 and second path 350 to be assigned as the primary and back-up paths for traffic sent between network node 320 and network node 321. Specifically, applying the techniques of the present disclosure would result in a node identifier being associated with each SRLG identifier, and basing the diversity determination on SRLG identifier/node identifier pairs. First path 340 would have the following SRLG identifier/node identifier pairs:
1. 100/D1 for network link 330; and
2. 200/D2 for network link 331.

Second path 350 would have the following SRLG identifier/node identifier pairs:
1. 300/D1 for network link 338;
2. 400/D4 for network link 337;
3. 500/D3 for network link 336;
4. 600/D5 for network link 335;
5. 700/D6 for network link 334;
6. 100/D7 for network link 333; and
7. 900/D8 for network link 332.

Even though both of first path 340 and second path 350 have links that include an SRLG identifier of "100," associated with network links 330 and 333, respectively, first path 340 and second path 350 may be determined as being diverse because the node identifier associated with network link 330 (i.e., "D1") is different than the node identifier associated with network link 333 (i.e., "D7").

Because network 305 and network 310 may be independently configured, identifiers like IP addresses may overlap between the two networks for the same reason SRLG identifiers may overlap—the identifiers were configured to be unique internal to networks 305 and 310, respectively, and not unique to outside networks. Accordingly, using an IP address as a node identifier may results SRLG identifier/node identifier pairs that overlap for network links in different networks that are actually diverse. While such an overlap is less likely than overlap of just SRLG identifiers, the potential overlap may be accounted for by using a MAC address as the node identifier. MAC addresses are configured to be unique across different networks, and may be used as a node identifier in network environments like network environment 300 in which traffic is sent across networks managed and configured by different vendors.

Figure 4A:
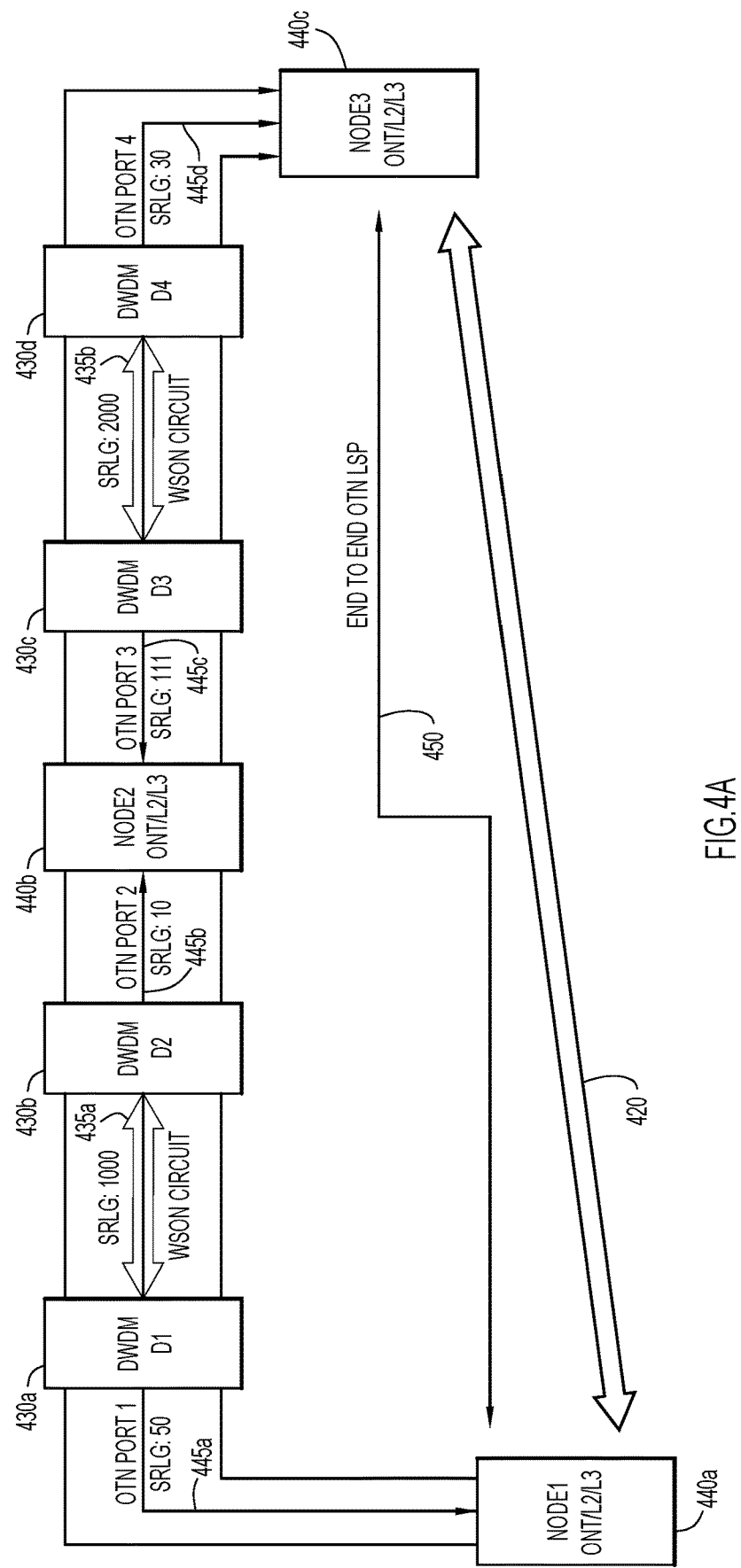
FIGS. 4A and 4B illustrate a network path through a network environment that includes a multilayer control plane and implementing Shared Risk Link Group robustness, according to an example embodiment.
Figure 4B:
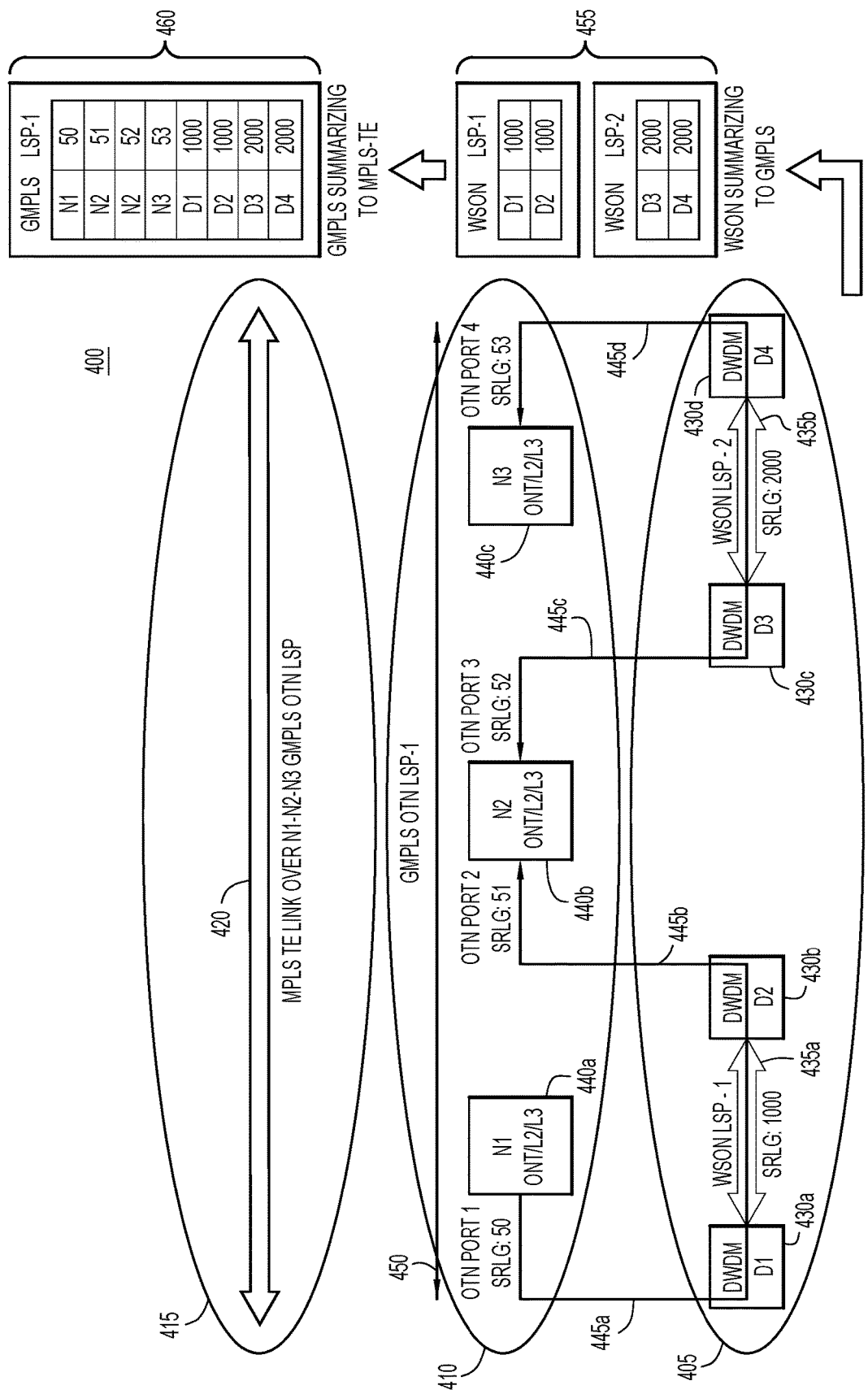

With reference now made to FIGS. 4A and 4B, depicted therein is a network implementation, including the elements controlled by each of control plane 405 (the OSI Model Layer 0 control plane), control plane 410 (the OSI Model Layer 1 control plane) and control plane 415 (the OSI Model Layer 2/3 control plane), for an MPLS Traffic Engineering (TE) link 420. FIGS. 4A and 4B illustrate how SLRG identifier/node identifier pairs are published from lower OSI Model layers to higher OSI model layers within network environment 400.

FIG. 4A shows the path through the physical elements that comprise MPLS TE link 420, while FIG. 4B illustrates in which of control planes 405, 410 and 415 the elements are controlled. As illustrated through control plane 405, the OSI Layer 0 control plane controls Dense Wave Division Multiplexing (DWDM) transceivers 430a-d and Wavelength Switched Optical Networks (WSON) label switched paths (LSPs) 435a and 435b. Control plane 410, the OSI Layer 1 control plane, controls Optical Transport Network (OTN) nodes 440a-c. OTN node 440a includes a first OTN port 445a, OTN node 440b includes OTN ports 445b and 445c, and OTN node 440c includes OTN port 445d. OTN nodes 440a-c form a GMPLS OTN LSP 450 that is also controlled in layer 410. Included in layer 415 is MPLS TE link 420.

In order to generate MPLS TE link 420, control plane 415 has awareness of the SRLG identifier/node identifier pairs for the layers below it in the OSI model layer. In order to provide this awareness to control plane 415, control planes 405 and 410 are configured to publish the SRLG identifier/node identifier pairs associated with their respective layers through publication messages 455 and 460. According to specific example embodiments, publication message 455 and 460 may be embodied as Route Reservation Protocol Route Record Object (RESV RRO) sub-objects, as disclosed in the Internet Engineering Task Force (IETF) Request for Comments (RFC) 8001, dated January 2017.

Publication message 455 is generated in control plane 405 and summarizes the SRLG identifier/node identifier pairs within control plane 405. According to the example embodiment of FIGS. 4A and 4B, the SRLG identifier/node identifier pairs include pairs of SRLG identifiers associated with WSON LSPs 435a and 435b and node identifiers associated with DWDM transceivers 430a-d. Accordingly, publication message 455 includes a first entry combining the node identifier "D1" for DWDM transceiver 430a and the SRLG identifier 1000 associated with WSON LSP 435a, a second entry combining the node identifier "D2" for DWDM transceiver 430b and the SRLG identifier 1000 associated with WSON LSP 435a, a third entry combining the node identifier "D3" for DWDM transceiver 430c and the SRLG identifier 2000 associated with WSON LSP 435b, and a fourth entry combining the node identifier "D4" for DWDM transceiver 430d and the SRLG identifier 2000 associated with WSON LSP 435b. Publication message 455 is published to control plane 410 as DWDM transceivers 430a-d and WSON LSPs 435a and 435b comprise the OSI Layer 0 elements utilized by GMPLS LSP 450. Because layer 405 may be embodied as a distributed control plane implemented through the network elements that make up the OSI Layer 0, publication message 455 may be generated at one or more of DWDM transceivers 430a-d.

Control plane 410 is configured to receive publication message 455 and compile the values received in publication message 455 with the SRLG identifier/node identifier pairs associated with control plane 410. Control plane 410 controls OSI Layer 1 network elements, which in the embodiment of FIGS. 4A and 4B include OTN nodes 440a-c and OTN ports 445a-d. Accordingly, the SRLG identifier/node identifiers associated with control plane 410 are the SRLG identifiers associated with OTN ports 445a-d and the node identifiers associated with OTN nodes 440a-c. Accordingly, the SRLG identifier/node identifier pairs determined by control plane 410 are the SRLG identifier "50" associated OTN port 445a combined with the node identifier "N1" associated with OTN node 440a, the SRLG identifier "51" associated OTN port 445b combined with the node identifier "N2" associated with OTN node 440b, the SRLG identifier "52" associated OTN port 445c combined with the node identifier "N2" associated with OTN node 440b, and the SRLG identifier "53" associated OTN port 445d combined with the node identifier "N3" associated with OTN node 440c. These SRLG identifier/node identifier pairs are combined with the SRLG identifier/node identifier pairs received in publication message 455 to generate publication message 460. Publication message 460 is published to control plane 415. Like control plane 405, control plane 410 may be implemented through a distributed control plane that is executed across the network elements within OSI Layer 1, in this case, OTN nodes 440a-c. Accordingly, publication message 460 may be generated and published by one or more of OTN nodes 440a-c.

Upon receipt of publication message 460, control plane 415 may utilize the information contained therein to ensure that MPLS TE link 420 is diverse from another MPLS TE link (not pictured) that will serve as a back-up (or primary) link to MPLS TE link 420. Even if an error or transmission through a second network results in duplicate SRLG identifiers used by diverse network links, the information provided to layer 415 through publication message 460 will permit control plane 415 to determine the actual diversity between the paths being considered. Because publication messages 455 and 460 include SRLG identifier/node identifier pairs, the node identifiers may be used to distinguish between links that share SRLG identifiers that are not diverse and those that actually are diverse. Like control planes 405 and 410, control plane 415 may be embodied as a distributed control plane implemented through MPLS TE switches and routers.

While the example embodiment illustrated in FIG. 4B relies on control plane 410 to distribute the information contained in publication message 455 to control plane 415, other example embodiments may rely on control plane 405 to directly publish the data contained in publication message 455 to control plane 415. According to such an example embodiment, control plane 410 would not need to publish the data contained in publication message 455 to control plane 415. Accordingly, the publication message corresponding to publication message 460 in such an embodiment may omit the data in publication message 460 derived from publication message 455.

Figure 5:
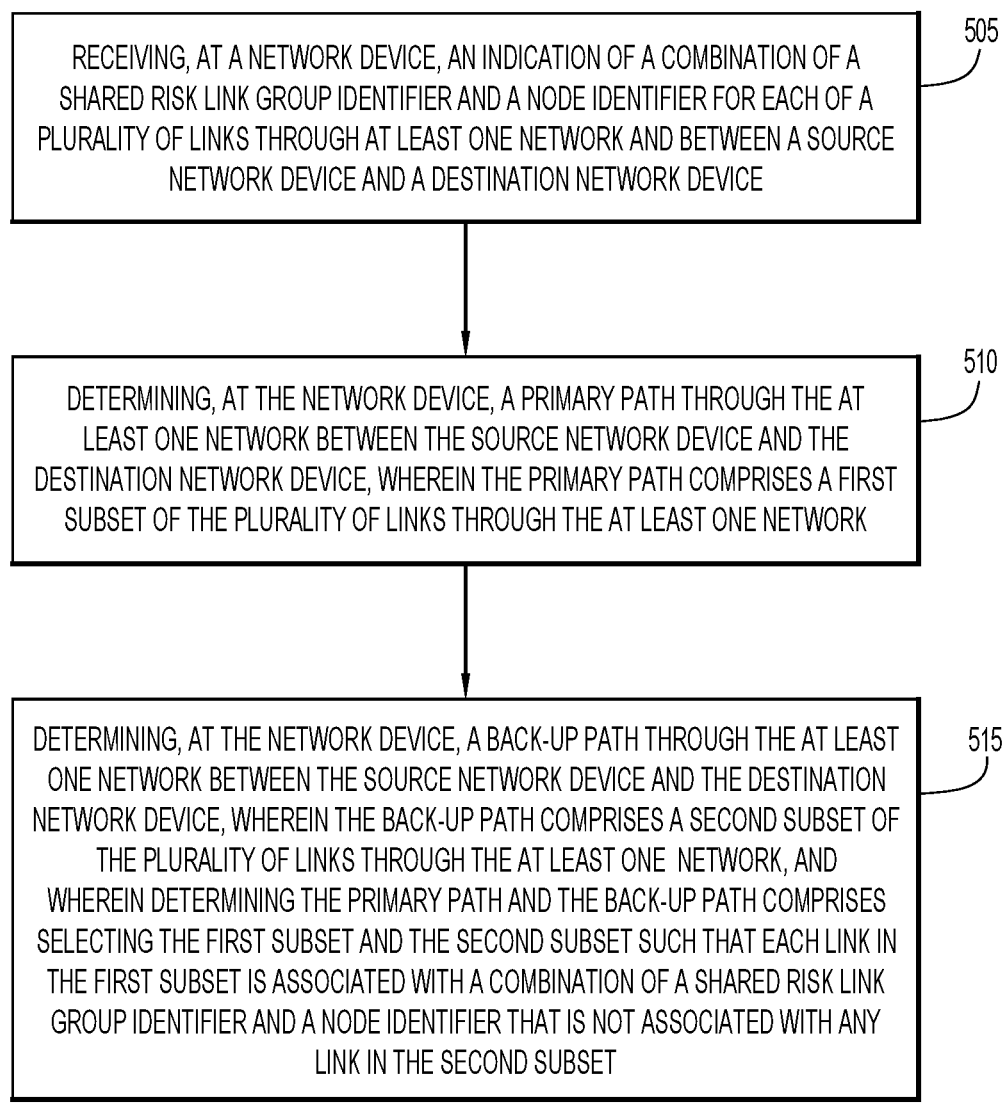
FIG. 5 is a first flowchart illustrating a first process flow for providing Shared Risk Link Group robustness, according to an example embodiment.

With reference now made to FIG. 5, depicted therein is a flowchart 500 providing a process flow for an example embodiment of the techniques described herein. The process flow illustrated in flow chart 500 may be utilized to select primary and back-up network paths that address the issues discussed above with reference to FIGS. 1-3, 4A and 4B. The process flow begins in operation 505 wherein an indication of a combination of a shared risk link group identifier and a node identifier for each of a plurality of links through at least one network and between a source network device and a destination network device are received at a network device. The network device of operation 505 may be embodied as, for example, the network devices illustrated in one or more of FIGS. 1-4. According to a specific example embodiment of operation 505, the receipt of the indications may include receiving one or more publication messages, such as publication messages 455 and/or 460 of FIGS. 4A and 4B. The receipt of the indications may also be embodied as the generation of the data contained in one or more of publication messages 455 and/or 460 of FIGS. 4A and 4B. Such an embodiment would include the determination of the SRLG identifier/node identifier pairs at a network device of an OSI Model Layer 0 control plane, such as DWDM transceivers 430a-d of control plane 405 of FIGS. 4A and 4B. Another such embodiment would include the determination of the SRLG identifier/node identifier pairs at a network device of an OSI Model Layer 1 control plane, such as OTN nodes 440a-c of control plane 410 of FIGS. 4A and 4B.

In operation 510, a primary path through the at least one network between the source network device and the destination network device is determined. The determination in operation 510 may take place such that the primary path comprises a first subset of the plurality of links through the at least one network. Said somewhat differently, operation 510 includes determining a first path through the at least one network from the source network device to the destination network device from the plurality of links referenced in operation 505.

In operation 515, a back-up path through the at least one network between the source network device and the destination network device is determined. The determination in operation 515 may take place such that the back-up path comprises a second subset of the plurality of links through the at least one network. Furthermore, the primary path and the back-up path are determined such that each link in the first subset is associated with a combination of a shared risk link group identifier and a node identifier that is not associated with any link in the second subset. In other words, operations 510 and 515 select links for the primary path that are associated with combinations of shared risk link group identifiers and node identifiers that are diverse from the combinations of shared risk link group identifiers and node identifiers associated with the links of the back-up path. Accordingly, links in the primary path and the back-up path may be associated with the same SRLG identifiers, so long as the node identifiers associated with the links are different. By selecting the primary and back-up paths in this way, diverse primary and back-up paths may be determined even when the paths have a common SRLG identifier.

Figure 6:
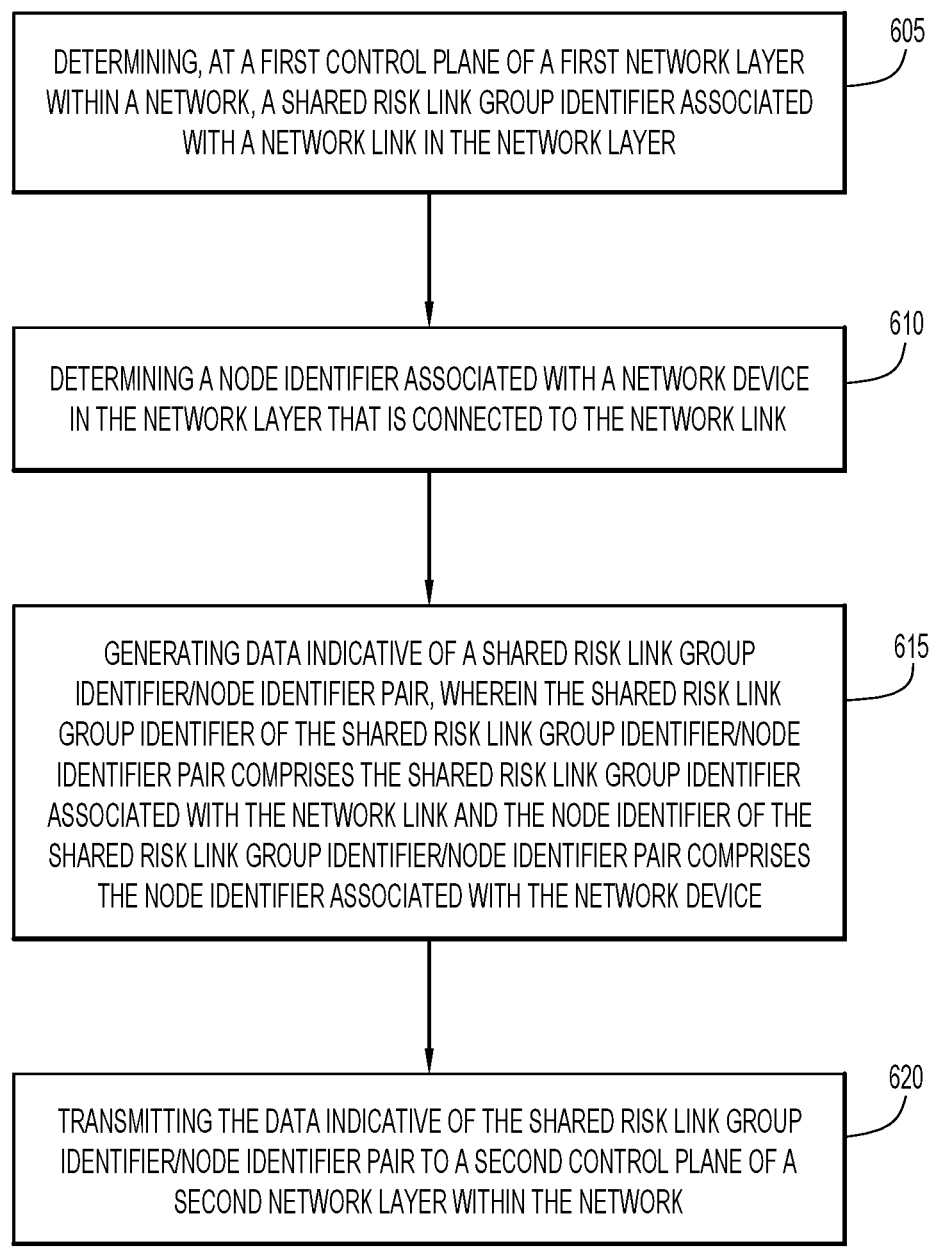
FIG. 6 is a second flowchart illustrating a second process flow for providing Shared Risk Link Group robustness, according to an example embodiment.

With reference now made to FIG. 6, depicted therein is a flowchart 600 providing a process flow for another example embodiment of the techniques described herein. The process flow illustrated through flowchart 600 may be utilized to provide network devices with SRLG identifier/node identifier pairs associated with network links that enable the network devices to carry out, for example, embodiments of the process flow illustrated in flowchart 500 of FIG. 5.

The process flow begins in operation 605 where an SRLG identifier associated with a network link in a network layer of a network is determined at a first control plane of the network layer. For example, operation 605 may be embodied as a network device, such as one or more of DWDM transceivers 430a-d of control plane 405 determining the SRLG identifiers associated with one or more of LSPs 435a and 435b, as illustrated in FIGS. 4A and 4B. Operation 605 may also be embodied as one or more of OTN nodes 440a-c determining the SRLG identifiers associated with one or more of OTN ports 445a-d, as also illustrated in FIGS. 4A and 4B.

In operation 610, a node identifier associated with a network device in the network layer that is connected to the network link is determined. For example, operation 610 may be embodied as one or more of DWDM transceivers 430a-d of control plane 405 of FIGS. 4A and 4B determining the node identifiers associated with one or more of DWDM transceivers 430a-d. Operation 605 may also be embodied as one or more of OTN nodes 440a-c determining the node identifiers associated with one or more of OTN nodes 440a-c, also of FIGS. 4A and 4B.

In operation 615, data indicative of a shared risk link group identifier/node identifier pair is generated. The shared risk link group identifier of the shared risk link group identifier/node identifier pair comprises the shared risk link group identifier associated with the network link, and the node identifier of the shared risk link group identifier/node identifier pair comprises the node identifier associated with the network device. Accordingly, example embodiments of operation 615 may include the generation of the data contained in one or more of publication message 455 and/or publication message 460 of FIGS. 4A and 4B.

Finally, in operation 620, the data indicative of the shared risk link group identifier/node identifier pair is transmitted to a second control plane of a second network layer within the network. Accordingly, example embodiments of operation 620 may include the publication of one or more of publication message 455 and/or publication message 460 of FIGS. 4A and 4B.

Figure 7:
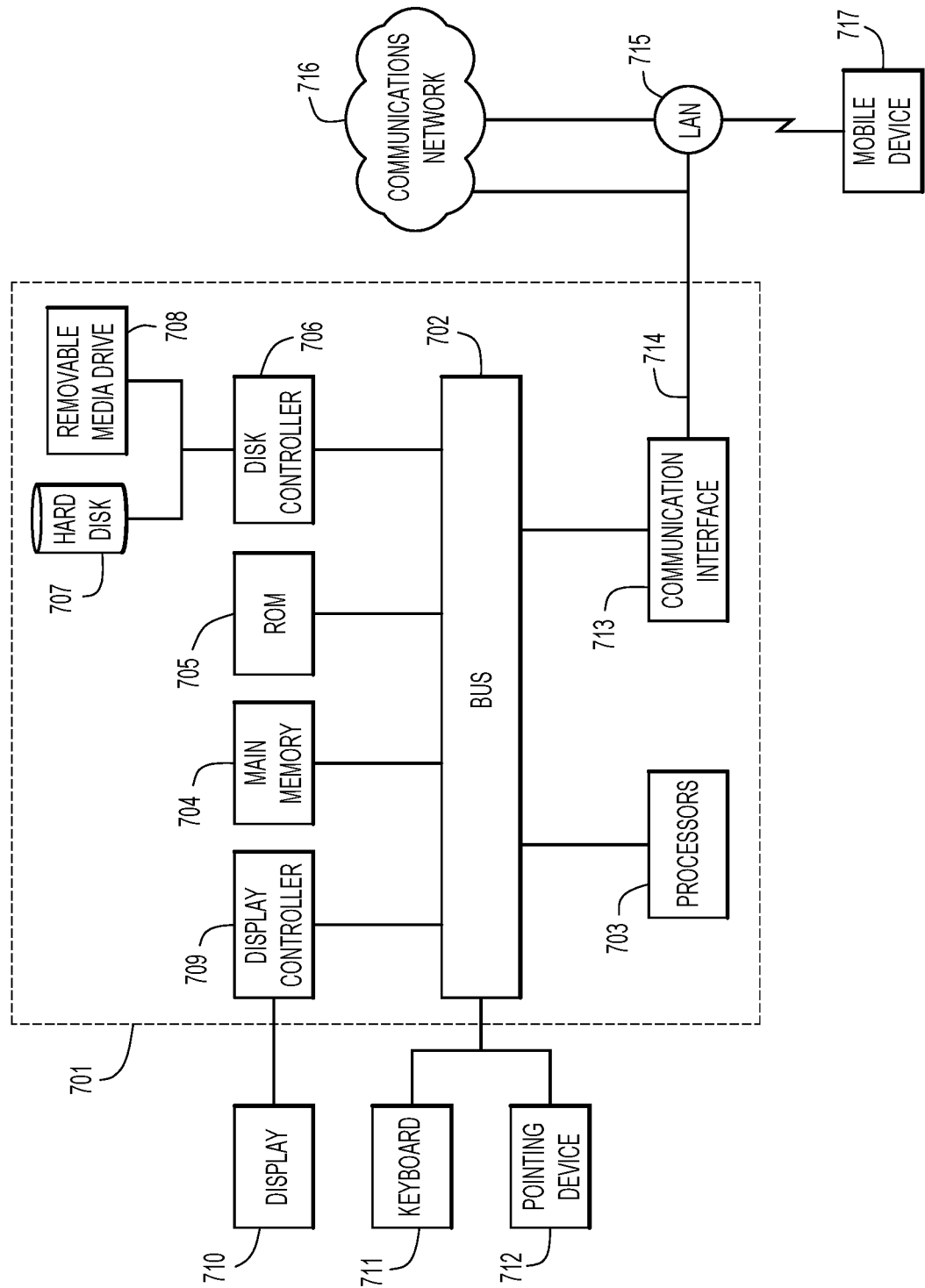
FIG. 7 is a block diagram of an apparatus configured to perform the techniques described herein, according to an example embodiment.

With reference now made to FIG. 7, depicted there is a computer system 701 upon which the embodiments presented may be implemented. The computer system 701 may be programmed to implement a computer-based device, such as any of the network devices illustrated in one or more of FIGS. 1-4B. The computer system 701 includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a cathode ray tube (CRT), Liquid Crystal Display (LCD) or other now known or hereinafter developed display technologies, for displaying information to a computer user. The computer system 701 includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing steps of the process in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the process, and for enabling the computer system 701 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

In summary, provided for herein are methods that include receiving, at a network device, an indication of a combination of a shared risk link group identifier and a node identifier for each of a plurality of links through at least one network and between a source network device and a destination network device; determining, at the network device, a primary path through the at least one network between the source network device and the destination network device, wherein the primary path comprises a first subset of the plurality of links through the at least one network; and determining, at the network device, a back-up path through the at least one network between the source network device and the destination network device, wherein the back-up path comprises a second subset of the plurality of links through the at least one network; wherein determining the primary path and the back-up path comprises selecting the first subset and the second subset such that each link in the first subset is associated with a combination of a shared risk link group identifier and a node identifier that is not associated with any link in the second sub set.

Also provided for herein are methods that include determining, at a first control plane of a first network layer within a network, a shared risk link group identifier associated with a network link in the network layer; determining a node identifier associated with a network device in the network layer that is connected to the network link; generating data indicative of an SRLG identifier/node identifier pair, wherein the shared risk link group identifier of the shared risk link group identifier/node identifier pair comprises the shared risk link group identifier associated with the network link and the node identifier of the shared risk link group identifier/node identifier pair comprises the node identifier associated with the network device; and transmitting the data indicative of the shared risk link group identifier/node identifier pair to a second control plane of a second network layer within the network.

According to other aspects of the present disclosure, an apparatus is provided that includes a network interface configured to communicate over at least one network; and a processor coupled to the network interface, wherein the processor is configured to: receive, via the network interface, an indication of a combination of a shared risk link group identifier and a node identifier for each of a plurality of links through the at least one network and between a source network device and a destination network device; determine a primary path through the at least one network between the source network device and the destination network device, wherein the primary path comprises a first subset of the plurality of links through the at least one network; and determine a back-up path through the at least one network between the source network device and the destination network device, wherein the back-up path comprises a second subset of the plurality of links through the at least one network. The processor is configured to determine the primary path and the back-up path by selecting the first subset and the second subset such that each link in the first subset is associated with a combination of a shared risk link group identifier and a node identifier that is not associated with any link in the second subset.

According to still other aspects of the present disclosure, an apparatus is provided that includes a network interface configured to enable network communications, and a processor coupled to the network interface, wherein the processor is configured to: determine, at a first control plane of a first network layer within a network, a Shared Risk Link Group (SRLG) identifier associated with a network link in the network layer; determine a node identifier associated with a network device in the network layer that is connected to the network link; generate data indicative of an SRLG identifier/node identifier pair, wherein the SRLG identifier of the SRLG identifier/node identifier pair comprises the SRLG identifier associated with the network link and the node identifier of the SRLG identifier/node identifier pair comprises the node identifier associated with the network device; and transmit the data indicative of the SRLG identifier/node identifier pair to a second control plane of a second network layer within the network.

According to additional aspects of the present disclosure, also provided for are computer readable media encoded with instructions. The instructions, when executed by one or more processors, are configured to cause the processor to receive, at a network device, an indication of a combination of a shared risk link group identifier and a node identifier for each of a plurality of links through at least one network and between a source network device and a destination network device; determine, at the network device, a primary path through the at least one network between the source network device and the destination network device, wherein the primary path comprises a first subset of the plurality of links through the at least one network; and determine, at the network device, a back-up path through the at least one network between the source network device and the destination network device, wherein the back-up path comprises a second subset of the plurality of links through the at least one network; wherein determining the primary path and the back-up path comprises selecting the first subset and the second subset such that each link in the first subset is associated with a combination of a shared risk link group identifier and a node identifier that is not associated with any link in the second sub set.

Accordingly, provided for herein are methods, devices and computer readable media configured to handle duplicate SRLG identifiers across control plane layers (DWDM, OTN and L2/L3). Such techniques may greatly assist service providers by providing this new capability to handle duplicate SRLG identifiers correctly.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
receiving, at a network device, an indication of a combination of a Shared Risk Link Group (SRLG) identifier and a node identifier for each of a plurality of links through at least one network and between a source network device and a destination network device;

determining, at the network device, a primary path through the at least one network between the source network device and the destination network device, wherein the primary path comprises a first subset of the plurality of links through the at least one network; and determining, at the network device, a back-up path through the at least one network between the source network device and the destination network device, wherein the back-up path comprises a second subset of the plurality of links through the at least one network, wherein determining the primary path and the back-up path comprises selecting the first subset and the second subset such that each link in the first subset is associated with a combination of an SRLG identifier and a node identifier that is not associated with any link in the second subset.

2. The method of claim 1, wherein determining the primary path and the back-up path comprises selecting the first subset and the second subset such that a link in the first subset is associated with an SRLG identifier that is also associated with a link in the second subset, and the link in the first subset is associated with a node identifier that is different than a node identifier associated with the link in the second subset.

3. The method of claim 1, wherein determining the primary path and the back-up path comprises selecting the first subset and the second subset such that a link in the first subset is within a first network, a link in the second subset is within a second network, the link in the first subset is associated with an SRLG identifier that is also associated with the link in the second subset, and the link in the first subset is associated with a node identifier that is different than a node identifier associated with the link in the second subset.

4. The method of claim 1, wherein the source network device and the destination network device are both arranged within the at least one network, and wherein the node identifier comprises an Internet Protocol address.

5. The method of claim 1, wherein the source network device and the destination network device are arranged within different networks, and wherein the node identifier comprises a Media Access Control address.

6. The method claim 1, wherein receiving the indication of the combination of the SRLG identifier and the node identifier for each of the plurality of links comprises receiving a plurality of indications at a Generalized Multiprotocol Label Switching control plane device from a Dense Wavelength Division Multiplexing control plane device or an Optical Transport Network control plane device.

7. The method of claim 1, wherein determining the primary path comprises determining a first Generalized Multiprotocol Label Switching path, and wherein determining the back-up path comprises determining a second Generalized Multiprotocol Label Switching path.

8. A method comprising:
determining, at a first control plane of a first network layer within a network, a Shared Risk Link Group (SRLG) identifier associated with a network link in the first network layer;
determining a node identifier associated with a network device in the first network layer that is connected to the network link;
generating data indicative of an SRLG identifier/node identifier pair, wherein the SRLG identifier of the SRLG identifier/node identifier pair comprises the SRLG identifier associated with the network link and the node identifier of the SRLG identifier/node identifier pair comprises the node identifier associated with the network device; and
transmitting the data indicative of the SRLG identifier/node identifier pair to a second control plane of a second network layer within the network based on which diversity of network links is determined,
wherein the first control plane comprises an Open Systems Interconnection Model Layer 0 control plane and the second control plane comprises an Open Systems Interconnection Model Layer 1 control plane, or
wherein the first control plane comprises the Open Systems Interconnection Model Layer 1 control plane and the second control plane comprises an Open Systems Interconnection Model Layer 2 control plane or an Open Systems Interconnection Model Layer 3 control plane.

9. The method of claim 8, wherein the first control plane comprises the Open Systems Interconnection Model Layer 0 control plane, and wherein the second control plane comprises the Open Systems Interconnection Model Layer 1 control plane.

10. The method of claim 9, wherein the SRLG identifier associated with the network link and the node identifier associated with the network device are determined at a Dense Wave Division Multiplexing transceiver.

11. The method of claim 8, wherein the first control plane comprises the Open Systems Interconnection Model Layer 1 control plane, and wherein the second control plane comprises the Open Systems Interconnection Model Layer 2 control plane or the OSI Model Layer 3 control plane.

12. The method of claim 11, wherein the SRLG identifier associated with the network link and the node identifier associated with the network device are determined at an Optical Transport Network node.

13. The method of claim 8, wherein generating the data comprises generating a Route Reservation Protocol Route Record Object (RESV RRO) sub-object.

14. An apparatus comprising:
a network interface configured to communicate over at least one network; and
a processor coupled to the network interface, wherein the processor is configured to:
receive, via the network interface, an indication of a combination of a Shared Risk Link Group (SRLG) identifier and a node identifier for each of a plurality of links through the at least one network and between a source network device and a destination network device;
determine a primary path through the at least one network between the source network device and the destination network device, wherein the primary path comprises a first subset of the plurality of links through the at least one network; and
determine a back-up path through the at least one network between the source network device and the destination network device, wherein the back-up path comprises a second subset of the plurality of links through the at least one network,
wherein the processor is configured to determine the primary path and the back-up path by selecting the first subset and the second subset such that each link in the first subset is associated with a combination of an SRLG identifier and a node identifier that is not associated with any link in the second subset.

15. The apparatus of claim 14, wherein the processor is configured to determine the primary path and the back-up path by selecting the first subset and the second subset such that a link in the first subset is associated with an SRLG identifier that is also associated with a link in the second subset, and the link in the first subset is associated with a node identifier that is different than a node identifier associated with the link in the second sub set.

16. The apparatus of claim 14, wherein the processor is configured to determine the primary path and the back-up path by selecting the first subset and the second subset such that a link in the first subset is within a first network, a link in the second subset is within a second network, the link in the first subset is associated with an SRLG identifier that is also associated with the link in the second subset, and the link in the first subset is associated with a node identifier that is different than a node identifier associated with the link in the second sub set.

17. The apparatus of claim 14, wherein the source network device and the destination network device are both arranged within the at least one network, and wherein the node identifier comprises an Internet Protocol address.

18. The apparatus of claim 14, wherein the source network device and the destination network device are arranged within different networks, and wherein the node identifier comprises a Media Access Control address.

19. The apparatus of claim 14, wherein the processor is configured receive the indication of the combination of the SRLG identifier and the node identifier for each of the plurality of links by receiving a plurality of indications at a Generalized Multiprotocol Label Switching control plane device from a Dense Wavelength Division Multiplexing control plane device or an Optical Transport Network control plane device.

20. The apparatus of claim 14, wherein determining the primary path comprises determining a first Generalized Multiprotocol Label Switching path, and wherein determining the back-up path comprises determining a second Generalized Multiprotocol Label Switching path.

* * * * *